United States Patent [19]

Lam

[11] Patent Number: 5,559,657

[45] Date of Patent: Sep. 24, 1996

[54] EARTH FAULT CIRCUIT BREAKER

[75] Inventor: Sheir C. Lam, 507 Thriving Industrial Centre, 26-38 Sha Tsui Road, Tuen Wan New Territories, Hong Kong

[73] Assignees: Sheir C. Lam, Kowloon; Pui Y. Tam, Hong Kong, both of Hong Kong

[21] Appl. No.: 261,894

[22] Filed: Jun. 15, 1994

[30] Foreign Application Priority Data

Jun. 15, 1993 [GB] United Kingdom ............... 9312284

[51] Int. Cl.$^6$ ................................................ H02H 3/00
[52] U.S. Cl. ................................................ 361/42; 361/45
[58] Field of Search ................................. 361/42, 44, 45, 361/49, 86

[56] References Cited

U.S. PATENT DOCUMENTS

| 3,864,581 | 2/1975 | Satyanarayana | 361/45 |
| 5,177,657 | 1/1993 | Baer et al. | 361/45 |

*Primary Examiner*—Jeffrey A. Gaffin
*Assistant Examiner*—Sally C. Medley

*Attorney, Agent, or Firm*—Leydig, Voit & Mayer

[57] ABSTRACT

An earth fault circuit breaker (10) for use in a circuit including an AC power supply and a load (11), which circuit breaker comprises a current-to-voltage converter (12) having two transformers for monitoring the current before and after flowing through the load, a leakage current/voltage detector (13A) for processing the outputs (E1 & E2) of the transformers to produce a resultant voltage, a voltage comparator (16) for comparing the said resultant voltage with a predetermined reference voltage to determine if there is a difference between the two transformer outputs, which is caused by an earth fault appearing at the load, and a switching driver (14) for disconnecting the load from the power supply in response to such a difference between the two transformer outputs exceeding the predetermined reference voltage, wherein each transformer has first and second primary windings (P1 & P2) arranged to be connected to opposite sides of the load and the two transformers are arranged to provide outputs at their respective secondary windings (S), corresponding to the normal load current (I2), in a substantially anti-phase relationship. The circuit breaker (10) may optionally include another voltage comparator (21) to detect overload current by monitoring the output of either one of the transformers.

9 Claims, 3 Drawing Sheets

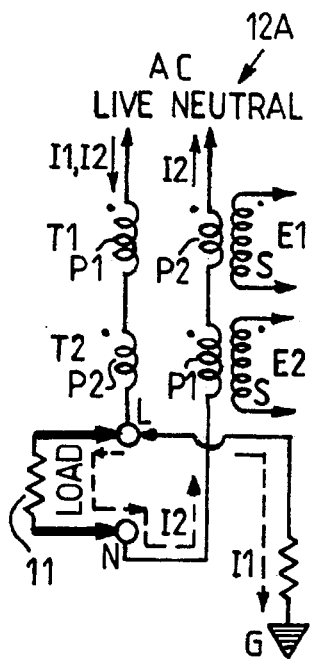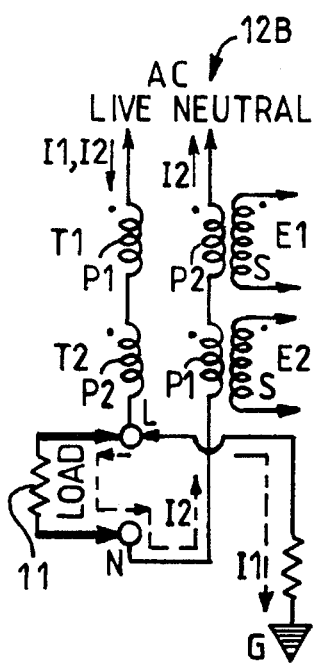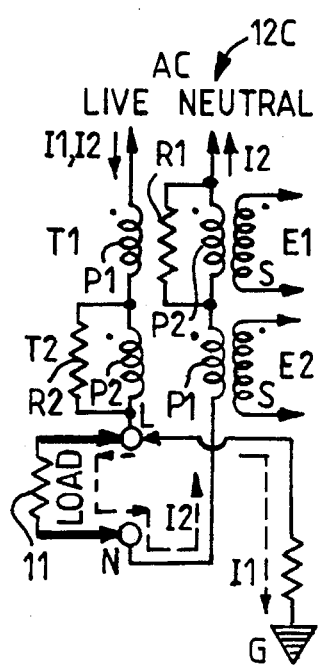
FIG.2A　　　　FIG.2B　　　　FIG.2C
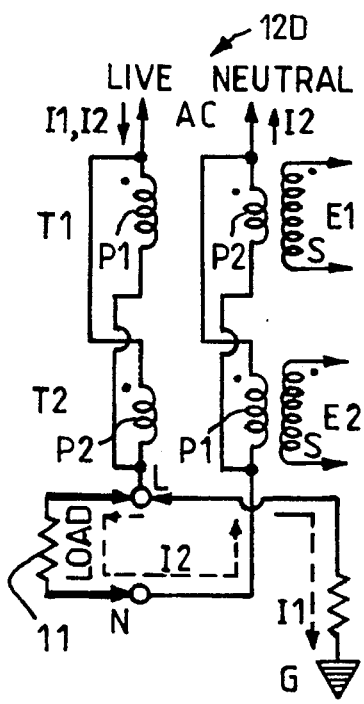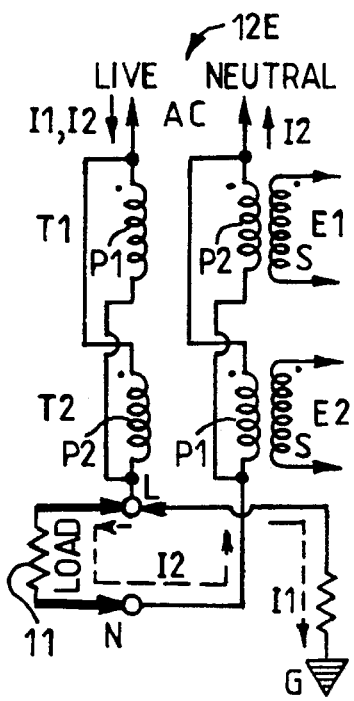
FIG.2D　　　　FIG.2E

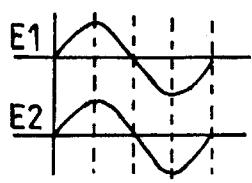 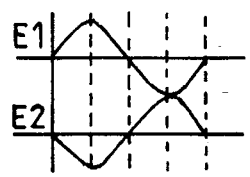 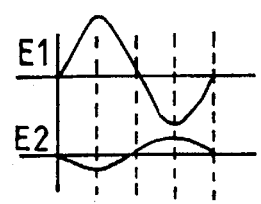
FIG.3A  FIG.3B  FIG.3C
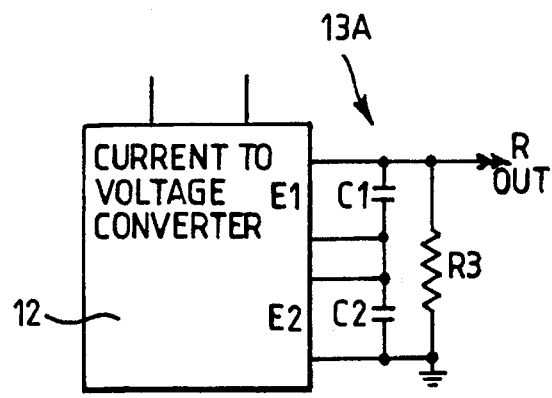
FIG.4A
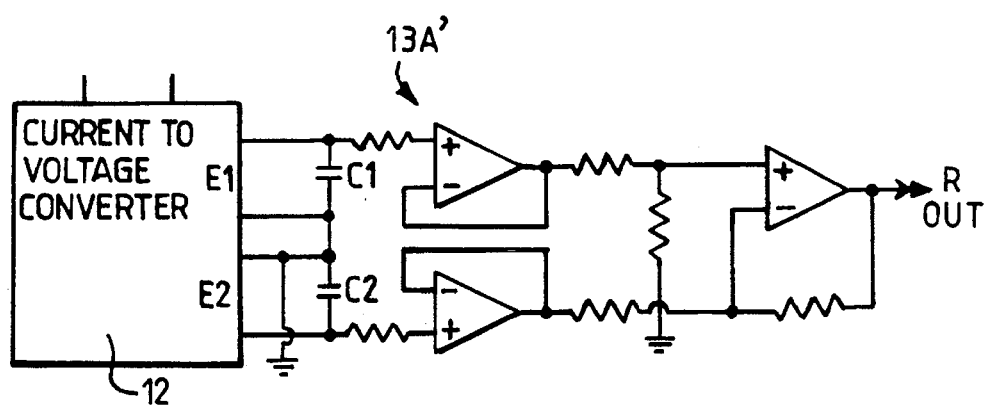
FIG.4B

5,559,657

EARTH FAULT CIRCUIT BREAKER

The present invention relates to an earth fault circuit breaker capable of disconnecting a load from an AC power supply when there is an accidental earth leakage of the load current, and optionally when there is an over-load current.

SUMMARY OF THE INVENTION

According to a first aspect of the invention, there is provided an earth fault circuit breaker for use in a circuit including an AC power supply and a load. The circuit breaker includes a current-to-voltage converter having two transformers for monitoring the current before and after flowing through the load, a leakage current/voltage detector for processing the outputs of the transformers to produce a resultant voltage, a voltage comparator for comparing the said resultant voltage with a predetermined reference voltage to determine if there is a difference between the two transformer outputs, which is caused by an earth fault appearing at the load, and a switching circuit for disconnecting the load from the power supply in response to such a difference between the two transformer outputs exceeding the predetermined reference voltage, wherein each transformer has first and second primary windings arranged to be connected to opposite sides of the load and the two transformers are arranged to provide outputs at their respective secondary windings, corresponding to the normal load current, in a substantially anti-phase relationship.

According to a second aspect of the invention, there is provided an earth fault circuit breaker for use in a circuit including an AC power supply and a load, which circuit breaker comprises a current-to-voltage converter having two transformers for monitoring the current before and after flowing through the load, a voltage comparator for comparing the corresponding outputs of the transformers, and a switching circuit for disconnecting the load from the power supply in response to a difference between the two transformer outputs, which is caused by an earth fault appearing at the load, exceeding a predetermined reference voltage, wherein each transformer has first and second primary windings arranged to be connected to opposite sides of the load and the two transformers are arranged to provide outputs at their respective secondary windings, corresponding to the normal load current, in a substantially anti-phase relationship.

It is preferred that the two transformers have substantially the same construction.

In a first preferred arrangement, the corresponding first primary windings of the transformers are connected together in series and the corresponding second primary windings are connected to each other in series.

In a second preferred arrangement, the corresponding first primary windings of the transformers are connected together in parallel and the corresponding second primary windings are likewise comment in parallel.

In a first preferred embodiment, the first and second primary windings of each transformer have substantially the same wire cross-sectional area but different numbers of turns in order to render the transformer output at its secondary winding in a substantially anti-phase relationship with that of the other transformer.

In a second preferred embodiment, the first and second primary windings of each transformer have substantially the same number of turns but different wire cross-sectional areas in order to render the transformer output at its secondary winding in a substantially anti-phase relationship with that of the other transformer.

In a third preferred embodiment, the first and second primary windings of each transformer have substantially the same wire cross-sectional area and number of turns but one is connected in parallel with a resistor in order to render the transformer output at its secondary winding in a substantially anti-phase relationship with that of the other transformer.

Preferably, the predetermined reference voltage is adjustable in order to adjust the sensitivity of the circuit breaker responding to an earth fault.

The earth fault circuit breaker may further comprise another voltage comparator for comparing the output of either one of said transformers appearing at its secondary winding with a predetermined threshold voltage, exceeding which the switching circuit is to operate in order to avoid an over-current flowing through the load.

Advantageously, the predetermined threshold voltage of the said another voltage comparator is adjustable in order to adjust the sensitivity of the circuit breaker responding to such an over-current.

The invention will now be more particularly described, by way of example only, with reference to the accompanying drawings.

BRIEF DESCRIPTION OF THE DRAWINGS

FIGS. 2A to 2E are schematic circuit diagrams of five possible current-to-,voltage converters suitable for use in the circuit breaker of FIG. 1;

FIGS. 3A to 3C are waveform diagrams showing the load and leakage currents detected by each current-to-voltage converter of FIGS. 2A to 2E; and FIGS. 4A and 4B are schematic circuit diagrams of two possible leakage current/voltage detectors suitable for use in the circuit breaker of FIG. 1.

DETAILED DESCRIPTION OF PREFERRED EMBODIMENT

Figure 1:
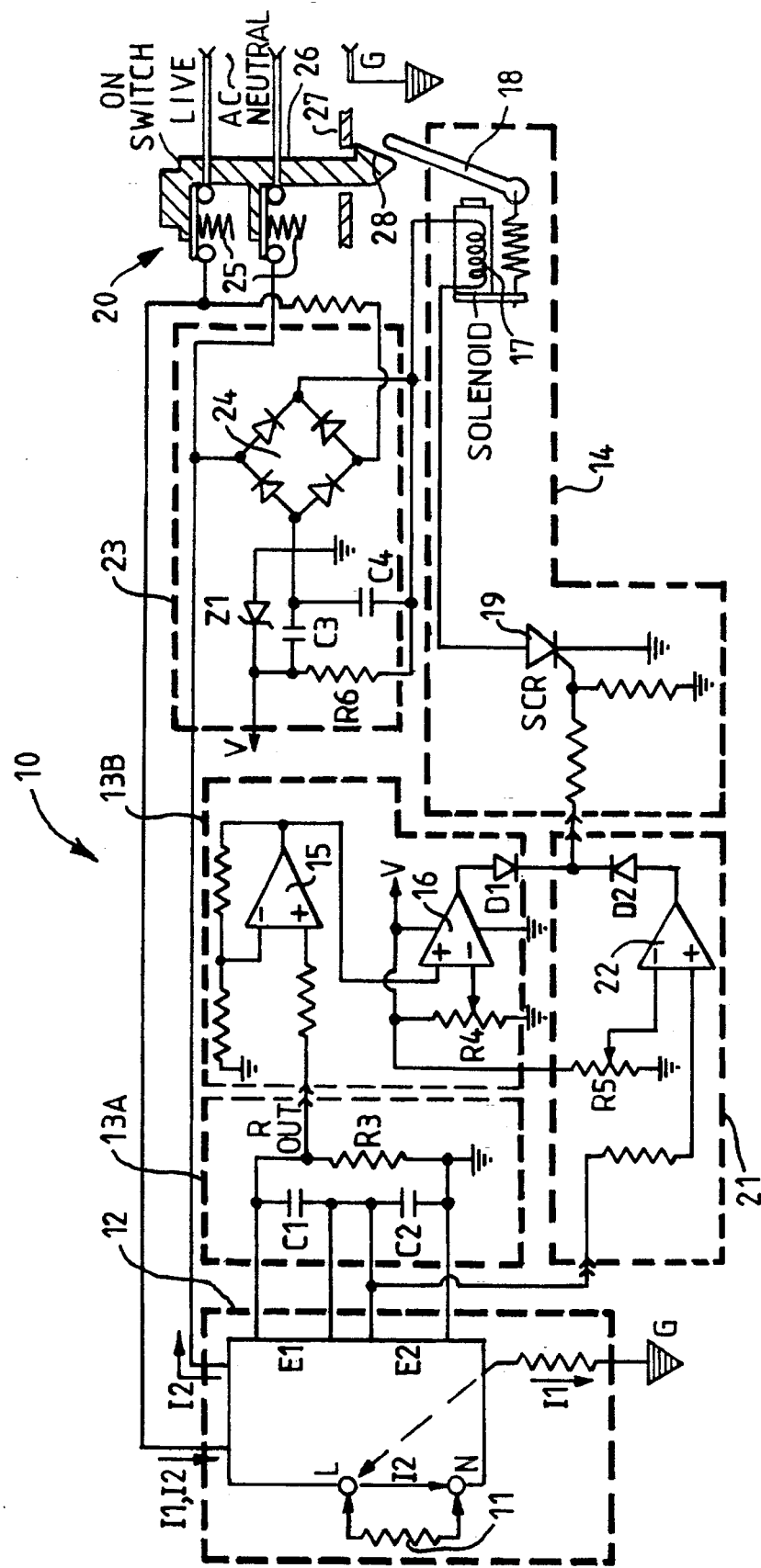
FIG. 1 is a schematic circuit diagram of an embodiment of an earth fault; circuit breaker according to the invention.

Referring first to FIG. 1 of the drawings, there is shown an earth fault circuit breaker 10 embodying the invention, which is used in a circuit including a load 11 and an AC power supply (not shown). The circuit breaker 10 comprises a current-to-voltage converter 12, to which the load 11 is connected, for monitoring the load current including any earth fault current leaking from the load 11. A leakage current/voltage detector 13A is connected to the output of the converter 12 for processing the converter output voltage to provide a resultant voltage for checking against a predetermined reference voltage to see if there is an earth leakage current. The circuit breaker 10 further includes a switching driver 14 arranged to disconnect the load 11 from the power supply in response to the presence of an earth leakage current.

FIGS. 2A to 2E show five alternative circuit designs to implement the current-to-voltage converter 12, of which the converter 12A of FIG. 2A is first referred to. The converter 12A is formed by first and second transformers T1 and T2. The transformer T1 has first and second primary windings P1 and P2, and the transformer T2 has first and second primary windings P2 and P1. The corresponding primary windings P1 of the transformers T1 and T2 are identical, and so are the respective primary windings P2. The transformers T1 and T2 have corresponding identical secondary windings S. The first primary windings P1 and P2 of the transformers T1 and T2 are connected in series on the LIVE side of the load 11, and the second primary windings P2 and P1 on the load NEUTRAL side. It is to be understood that the transformers T1 and T2 have the same construction, but the connection of the primary windings P1 and P2 of one transformer T1 with respect to the load 11 is opposite to that for the other transformer T2.

In FIG. 2A, the normal load current is designated by I2 and the leakage current caused by an earth fault appearing at the load is designated by I1. The load current I2 flows through both primary windings P1 and P2 of each transformer T1 or T2, but the leakage current I1 will only flow through, as shown, the first primary winding P1 of the transformer T1 and the first primary winding P2 of the transformer T2.

The primary windings P1 and P2 of each transformer T1 or T2 have the same wire cross-sectional area, but the primary winding P1 has a relatively larger number of turns than the primary winding P2. The relative number of turns of the magnetically-coupled primary windings P1 and P2 is a factor determining the North/South polarity of the transformer T1 or T2. The configuration and arrangement of the primary windings P1 and P2 of the transformers T1 and T2 are designed such that the respective transformer inductances have the same magnitude but substantially in an anti-phase relationship. The load current I2 passing through the transformers T1 and T2 will cause substantially opposite North/South polarization effect in the primary windings P1 and P2. The North/South polarity of the magnetic field of each transformer T1 or T2 at any given time is determined by the resultant magnetic induction of one primary winding P1 or P2 over or below the other primary winding P2 or P1.

Insofar as the load current I2 is concerned, this results in output emf's E1 and E2 at the corresponding secondary windings S of the transformers T1 and T2 having the same magnitude but 180° out of phase, as shown in FIG. 3B. As the leakage current I1 flows only through the first primary windings P1 and P2 but not the second primary windings P2 and P1 of the transformers T1 and T2, respectively, the emf's E1 and E2 induced by the leakage current I1 at the transformer secondary windings S remain in phase, as shown in FIG. 3A. The combined waveform of the emf E1 or E2 induced by the load and leakage currents I2 and I1 for each transformer T1 or T2 is shown in FIG. 3C.

FIGS. 4A and 4B of the drawings show two alternative designs 13A and 13A' for the leakage current/voltage detector, the output of which is connected to a voltage comparator block 13B.

The leakage current/voltage detector 13A is formed by a series pair of filtering capacitors C1 and C2 connected across the secondary windings S of the transformers T1 and T2, respectively, and by a resistor R3 connected in parallel with the pair of capacitors C1 and C2. As the capacitors C1 and C2 are connected in series, the filtered/rectified output emf's E1 and E2 of the transformers T1 and T2 are superimposed together to produce a resultant voltage appearing across the resistor R3 for the voltage comparator block 13B to process. It is to be understood that the two emf's induced by the load current I2 alone are substantially cancelled out by reason of their anti-phase relationship, resulting in the voltage representing a doubted Value of the leakage current I1.

The voltage comparator block 13B comprises an op-amp (operational amplifier) amplifier 15 for amplifying the resultant voltage given by the leakage current/voltage detector 13A and an op-amp comparator 16 for comparing the amplified resultant voltage with the reference voltage which is predetermined but adjustable by means of a variable resistor R4. The reference voltage corresponds to the maximum tolerable limit of an earth fault leakage current. Thus the triggering sensitivity of the circuit breaker 10 responding to an earth fault is adjustable. The op-amp comparator 16 has at its output a diode D1 which conducts when the amplified resultant voltage exceeds the reference voltage.

The switching driver 14 is formed by a solenoid 17 controlling a spring-biassed hinged soft iron arm 18 and a thyristor 19 controlling the operation of the solenoid 17. The diode D1 of the op-amp comparator 16 is connected to the gate terminal of the thyristor 19 such that when the diode D1 conducts (in response to occurrence of leakage current I1) to trigger the thyristor 19 via its gate terminal, the thyristor 19 conducts to permit energizing of the solenoid 17. The solenoid 17 then attracts to pivot the hinged arm 18 forwards to open a double-pole/double-throw switch 20 controlling the supply of power from the power supply to the load 11.

It is to be appreciated that the leakage current I1 may occur at any part of the load circuit, resulting in an unbalanced or unsymmetrical state between the outputs of the transformers T1 and T2 and thereby producing a resultant voltage to trip the switch 20 by means of the switching driver 14.

The circuit breaker 10 further includes another voltage comparator block 21, incorporating an op-amp comparator 22, for detecting any over-current flowing through the load 11. A first input terminal of the op-amp comparator 22 is connected to the secondary winding S of the transformer T2 (or to that of the transformer T1) for picking up the output voltage of the transformer T2 (or transformer T1), said output voltage representing the magnitude of the load current I2. A second input terminal of the op-amp comparator 22 is connected to a variable resistor R5 provided across a DC operating voltage V for the entire circuitry and the local earth. The variable resistor R5 determines an adjustable threshold voltage for comparison by the op-amp comparator 22 with the voltage picked-up by the first input terminal. When the picked-up voltage exceeds the threshold voltage, the op-amp comparator 22 provides an output through a diode D2 connected to the gate terminal of the thyristor 19, thereby triggering the thyristor 19 to operate the solenoid 17 to open the switch 20 in order to disconnect the load 11 from the power supply. It is appreciated that by means of the variable resistor R5, the sensitivity of the circuit breaker 10 responding to a load over-current is adjustable.

The switch 20 has a pair of spring-biassed moving switch contacts 25 and a elongate operating member 26 bearing at one end on the switch contacts 25. The opposite end of the operating member 26 has a hook formation 27 normally engaging behind a fixed abutment 28 to hold the switch 20 closed. The hinged arm 18 is pivoted by the solenoid 17 to push the hook formation 27 off the abutment 28 to open the switch 20. After the earth fault or over-current has been rectified, the switch 20 is reset to re-connect the load 11 to the power supply by manually pushing the operating member 26 longitudinally back until the hook formation 27 engages behind the abutment 28 again, thereby re-closing the switch 20.

The circuit breaker 10 further includes a built-in voltage regulator 23 for converting the main AC voltage from the power supply into a DC voltage V for operating the entire circuitry. The regulator 23 is formed by a bridge rectifier 24, two capacitors C3 and C4, a resistor R6 and a zener diode Z1 connected together in a conventional manner to perform full wave rectification.

Referring more specifically to FIG. 2B showing a second current-to-voltage converter 12B which operates generally in the same manner as the first converter 12A. In this converter 12B, the primary windings P1 and P2 of both transformers T1 and T2 have the same number of turns but the primary windings P2 have a relatively larger wire cross-sectional area than the primary windings P1. Insofar as each pair of magnetically-coupled primary windings P1 and P2 is concerned, these windings interact to determine a certain phase shift for the transformer output emf E1 or E2 induced by the load current I2 flowing through both windings. The corresponding pairs of primary windings P1 and P2 of the transformers T1 and T2 are arranged such that the respective load current-induced transformer output emf's E1 and E2 are directly 1800° out of phase. Insofar as the leakage current I1 is concerned, the corresponding induced transformer output emf's E1 and E2 remain in phase as the leakage current I1 only flows through the first primary windings but not the second primary windings of the transformers T1 and T2.

More specific reference is now made to FIG. 2C, showing a third current-to-voltage converter 12C which again operates generally in the same manner as the first converter 12A. All the four primary windings P1 and P2 of the transformers T1 and T2 have the same wire cross-sectional area and the same number of turns, but a resistor R1 or R2 is connected in parallel with each primary winding P2 to determine the required phase shift for the transformer output emf's E1 and E2.

FIGS. 2D and 2E show two other alternative current-to-voltage converters 12D and 12E which are very similar to the first and second converters 12A and 12B, respectively, except that the two first or second primary windings P1 and P2 are connected together in parallel rather than in series.

The invention has been given by way of example only, and various other modifications of and/or alterations to the described embodiment may be made by persons skilled in the art without departing from the scope of the invention as specified in the appended claims.

What is claimed is:

1. An earth fault circuit breaker for use in a circuit including an AC power supply and a load, said circuit breaker comprising a current-to-voltage converter having first and second transformers for monitoring current flowing into the load and current flowing from the load, each transformer including first and second primary windings, the first primary winding of at least one of the transformers being arranged to be connected to a first side of the load and the second primary winding of the at least one transformer being arranged to be connected to a second side of the load, and including a secondary winding wherein a voltage is induced in the secondary winding of the first transformer;

a leakage current/voltage detector for processing the induced voltage of the first and second transformers to produce a resultant voltage;

a voltage comparator for comparing the resultant voltage with a predetermined reference voltage and for generating a signal indicative of a difference between the induced voltage of the first transformer and the induced voltage of the second transformer; and a switching circuit for disconnecting the load from the power supply in response to a signal from said voltage comparator representing a difference between the induced voltages of the first and second transformers, the first and second transformers being connected such that a component of the induced voltage in the first transformer is out of phase with a component of the induced voltage in the second transformer.

2. The earth fault circuit breaker of claim 1 wherein the corresponding first primary windings of the first and second transformers are connected together in series and the corresponding second primary windings of the first and second transformers are connected together in series.

3. The earth fault circuit breaker of claim 1 wherein the corresponding first primary windings of the first and second transformers are connected together in parallel and the corresponding second primary windings of the first and second transformers are connected together in parallel.

4. The earth fault circuit breaker of claim 1, wherein the first and second primary windings of each transformer have substantially the same wire cross-sectional area but different numbers of turns.

5. The earth fault circuit breaker of claim 1, wherein the first and second primary windings of each transformer have substantially the same number of turns but different wire cross-sectional areas.

6. The earth fault circuit breaker of claim 1 wherein the first and second primary windings of each transformer have substantially the same wire cross-sectional area and number of turns but one of the first and second primary winding is connected in parallel with a resistor.

7. The earth fault circuit breaker of claim 1 further comprising means for adjusting the predetermined reference voltage to change the sensitivity of the circuit breaker responding to an earth fault.

8. The earth fault circuit breaker of claim 1 further comprising a second voltage comparator for comparing the voltage across the secondary winding of one of the transformers with a predetermined threshold voltage, whereby the switching circuit is operated in order to avoid an overcurrent flowing through the load when the voltage across the secondary exceeds the predetermined voltage.

9. The earth fault circuit breaker of claim 8, further comprising means for changing the predetermined threshold voltage of said another voltage comparator to adjust the sensitivity of the circuit breaker.

\* \* \* \* \*